May 3, 1960
G. COLEONDRO ET AL
2,935,266
LAWN SPRINKLER HEAD
Filed June 30, 1958
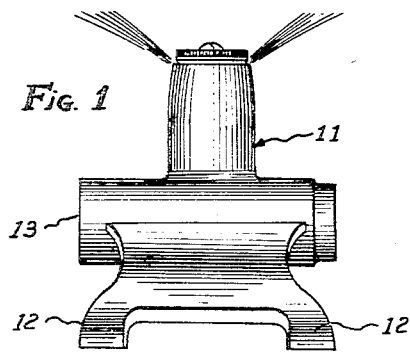
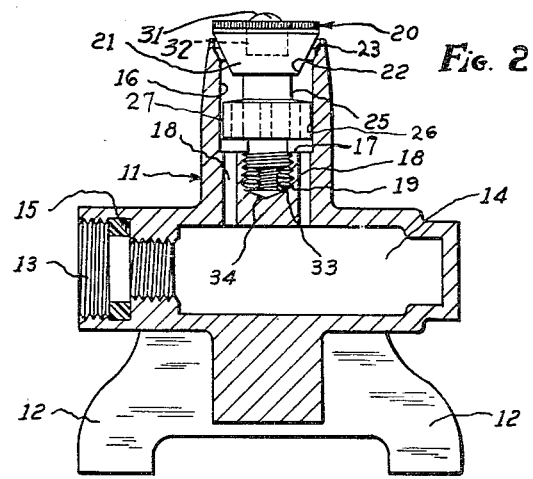
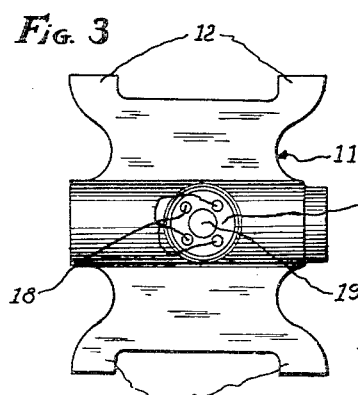
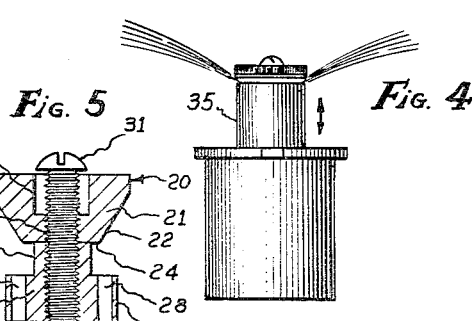
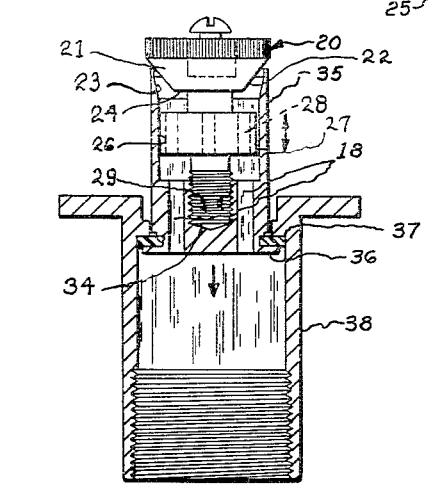
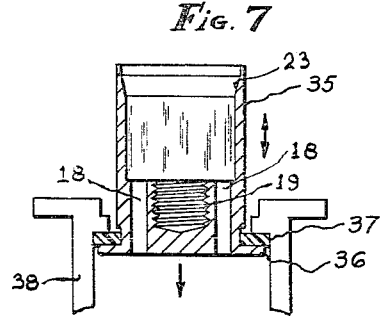
GERALDO COLEONDRO
AND
DAVID GUBITOSA
INVENTOR.
BY Norman N. Popper
ATTORNEY

United States Patent Office 2,935,266
Patented May 3, 1960

2,935,266

LAWN SPRINKLER HEAD

Geraldo Coleondro and David Gubitosa, Orange, N.J.

Application June 30, 1958, Serial No. 745,508

4 Claims. (Cl. 239—456)

Our invention relates generally to lawn sprinkler heads and specifically to lawn sprinkler heads which may be used on a movable lawn sprinkler or may be used in an underground system as part thereof.

It is among the objects of our invention to provide a lawn sprinkler which provides a uniform pattern of distribution of water.

It is a further object of our invention to provide a lawn sprinkler head which maintains a locked adjustment unvarying under ordinary conditions of operation.

Yet another object of our invention is to provide a lawn sprinkler head which is easily adjustable.

A still further object of our invention is to provide a lawn sprinkler head which provides a uniform pattern of distribution over the entire spray area.

Yet another object of our invention is to provide a lawn sprinkler head which maintains its centered position over the entire range of its adjustment.

Yet another object of our invention is to provide a lawn sprinkler head which incorporates a pressure chamber to insure uniform pressurized distribution of water.

Among the further objects of our invention is to provide a lawn sprinkler head which is relatively inexpensive, durable and easy to maintain.

These objects and advantages, as well as other objects and advantages may be attained by the device illustrated in the drawings in which:

Figure 1 is a side elevational view of a lawn sprinkler head made in accordance with our invention and incorporated in a movable lawn sprinkler;

Figure 2 is an enlarged vertical sectional view thereof;

Figure 3 is a top view of Figure 1 with the valve removed;

Figure 4 is a side elevational view of a lawn sprinkler head installed in a housing for use in a permanently installed underground pipe network;

Figure 5 is an enlarged vertical elevational sectional view of the valve portion of our lawn sprinkler head;

Figure 6 is an enlarged side elevational sectional view of our lawn sprinkler head incorporated in a housing for use in a permanently installed underground pipe network; and Figure 7 is an enlarged side elevational view of the housing shown in Figure 6 without the valve.

In our lawn sprinkler head the valve portion is precisely maintained in a central position by an enlargement on the valve stem which slidably engages the walls of the bore of the housing. This insures the accurate positioning of the valve in precise spaced relationship to the entrance to the bore so that at all times the valve may be accurately spaced away from the entrance lips of the bore. This insures a uniform distribution of the water being discharged from the lawn sprinkler head.

In addition to the uniform distribution of water, our lawn sprinkler head permanently maintains its adjustment by reason of a set screw adapted to exert tension on the valve at the point of threaded engagement with the housing, thereby insuring that any chosen position of the valve will be permanently maintained until the set screw is adjusted to release the tension. In this manner our lawn sprinkler provides a uniform distribution of water in droplet or spray form over its entire range by reason of the precise spacial alignment of the valve with the housing and this position may be permanently set against casual displacement by tightening the set screw; once the lawn sprinkler head is adjusted at the desired distributional characteristic, it will be locked in that position for continuous operation and will not lose its adjustment except by intentional manipulation of the set screw and valve head.

Referring now to the drawings in detail our lawn sprinkler head comprises a housing 11 which is provided with legs 12 so that it may stand upright on a lawn. One end 13 is provided with a transverse bore 14 the entrance to which is threaded for the admission of a suitable hose connection and may be provided with a washer 15. The upper portion of the housing is provided with a vertical bore 16 terminating in a floor 17. This vertical bore 16 is connected through the floor 17 to the horizontal bore 14 by a plurality of passages 18. The floor 17 is also provided with a central bore 19 arranged co-axially with the vertical bore 16 and threaded.

The vertical bore 16 defines a receptacle for a valve 20; the valve is provided with a head 21 having a wall 22 descending in a generally downward and inward direction as in an inverted cone. The top of the bore 16 likewise has a complementary wall 23 descending from the top of the housing 11 in a downward and generally inward direction. The head 21 is provided with a flat bottom 24 and an axial valve stem 25. On the central part of the valve stem 25, there is formed an annular enlargement 26. This enlargement 26 has an outer wall 27 so dimensioned as to lie in close, flat, conformity with the bore 16 so as to keep the head 21 properly centered in spaced relationship to the wall 23. This insures the uniform spacing of the walls 22, 23 from each other so that equal quantities of water will be discharged in all directions. The enlargement 26 has a plurality of vertical passages 28 to admit and permit the passage of water. The top of the enlargement 26 and the head 21 in combination with the walls of the bore 16 define a pressure chamber which insures uniform pressure at the discharge point of the water between the walls 22, 23. The bottom 29 of the stem 25 is threaded for engagement with the threaded bore 19. The valve has an axial central passage 30 which is threaded to receive a bolt 31. The head 20 has an axial bore 32 sufficient to permit the head of the bolt 31 to descend into it. The end 33 of the bolt 31 when properly adjusted will engage the bottom 34 of the bore 19 and exert tension upon the threaded end 29 of the stem 25 at the point where it engages the threaded bore 19. This locks the valve 20 against movement once it has been moved into threaded engagement to the proper position in the bore 16.

In the operation of our lawn sprinkler the head 20 is introduced to the housing 11 through its axial bore 16 until the threaded end 29 is engaged with the threaded bore 19. The valve 20 is then adjusted until the discharge space between the walls 22 and 23 is appropriate for the type of spray desired to be achieved. When this point is reached, the bolt 31 is turned in the central threaded bore 30 of the valve 20 until its lower end 33 bears upon the floor 34 and exerts tension upon the cooperating threads 29 and 19. This locks the valve against accidental displacement. The cooperation of the annular wall 27 with the annular wall of the bore 16 provides exact positioning for the valve 20 at all times and insures equal discharge of the water in all directions.

The same type of valve and a slightly modified housing is suitable in an underground pipe network in which the spray is distributed by heads which pop up under pressure. Instead of a housing 11 such as is shown in Figure 1, a housing 35 is utilized for this purpose. This housing 35 is structurally similar to the housing 11 insofar as its internal construction is concerned, i.e., the portions which cooperate with the valve 20. The valve 20 is identical in all respects. However, the housing 35 instead of having legs is provided with a bottom flange 36 which defines a seat for a washer 37. There are passages 18, 18, etc., by which water is permitted to enter the housing 35. This housing 35 is slidably positioned in a receptacle 38 which is part of the underground system. In the absence of water pressure, the housing 35 falls from the position shown in Figure 6 into the receptacle 38 and its valve 20 is flush with the top of the receptacle 38. Water pressure causes the housing 35 to move to the position shown in Figures 4, 6 and 7, and the washer 37 prevents it from being discharged from the receptacle 38. When the pressure is relieved, the housing 35 resumes its retracted position as aforementioned.

It is to be noted that the angular deviation of the walls 22, 23 is not critical, such deviation being preferably in the range of 30 degrees to 45 degrees above horizontal; this affects the area covered. It is also to be noted that in either the movable or the permanent sprinkler system, a chosen portion of the discharge area may be enlarged to exert a blocking effect to restrict the direction in which the water is discharged. Thus the top lip of the wall 23 may be raised for a suitable portion of its area so that that portion will actually contact the wall 22. Under such circumstances, no water will be discharged in the direction in which this blockage takes place. Such blockage may extend only over a small portion of the discharge area or may be substantial and include nearly the entire discharge area. By such means sidewalks adjacent to the lawn sprinkler head will not be wetted and the sprinkling is confined to the grassy areas.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:

1. A lawn sprinkler head comprising a housing having a vertical bore extending downwardly from the top of the housing, a floor at the bottom of the bore having a water passage therethrough, an axial threaded bore in the floor, a valve, a top on the valve adjustably engageable to seal the top of the bore in the housing, a valve-stem extending axially downwardly from the bottom of the valve into the bore of the housing, a central annular coaxial enlargement on the valve-stem in close slidable engagement with the bore of the housing, a threaded end at the bottom of the valve stem in threaded engagement with the threaded bore in the floor, the valve and valve stem also having an axial threaded passage, a threaded bolt in threaded engagement with the passage in the valve and extending therefrom at the bottom of the passage, the bolt engageable with the bottom of the bore in the floor, and the enlargement on the valve-stem having a passage therethrough.

2. A lawn sprinkler head comprising a housing having a vertical bore extending downwardly from the top of the housing, a floor at the bottom of the bore having a water passage therethrough, an axial threaded bore in the floor, a valve, a top on the valve adjustably engageable to seal the top of the bore in the housing, the engageable surfaces of the bore and the top on the valve disposed in general inverted conical opposition with each other, a valve-stem extending axially downwardly from the bottom of the valve into the bore of the housing, a central annular coaxial enlargement on the valve-stem in close slidable engagement with the bore of the housing, a threaded end at the bottom of the valve stem in threaded engagement with the threaded bore in the floor, the valve and valve stem also having an axial threaded passage, a threaded bolt in threaded engagement with the passage in the valve and extending therefrom at the bottom of the passage, the bolt engageable with the bottom of the bore in the floor, and the enlargement on the valve-stem having a passage therethrough.

3. A lawn sprinkler head comprising a housing having a vertical bore extending downwardly from the top of the housing, a floor at the bottom of the bore having a water passage therethrough, an axial threaded bore in the floor, a valve, a top on the valve adjustably engageable to seal the top of the bore in the housing, the engageable surfaces of the bore and the top on the valve disposed in general inverted conical opposition with each other, at an angle of approximately 30° to 40° above horizontal, a valve-stem extending axially downwardly from the bottom of the valve into the bore of the housing, a central annular coaxial enlargement on the valve-stem in close slidable engagement with the bore of the housing, a threaded end at the bottom of the valve stem in threaded engagement with the threaded bore in the floor, the valve and valve stem also having an axial threaded passage, a threaded bolt in threaded engagement with the passage in the valve and extending therefrom at the bottom of the passage, the bolt engageable with the bottom of the bore in the floor, and the enlargement on the valve-stem having a passage therethrough.

4. A lawn sprinkler head comprising a housing having a bore, a floor at the bottom of the bore, a threaded bore in the floor, a valve-stem, a threaded end on the valve-stem engaged with the threaded bore, a threaded axial passage in the valve stem, a threaded bolt in the passage engageable with the bottom of the threaded bore in the floor, whereby the threaded end on the valve-stem and the threaded bore in the floor are frictionally engaged together.

References Cited in the file of this patent

UNITED STATES PATENTS

| | | |
|---|---|---|
| 268,607 | Bell | Dec. 5, 1882 |
| 623,057 | Wertz | Apr. 11, 1899 |
| 1,726,490 | Irving et al. | Aug. 27, 1929 |
| 1,799,243 | Miller | Apr. 7, 1931 |
| 1,881,409 | Le Moon | Oct. 4, 1932 |
| 2,048,125 | Irving et al. | July 21, 1936 |
| 2,574,677 | Weiland | Nov. 13, 1951 |